Dec. 22, 1931.  E. F. BRUNNER  1,838,050

VEHICLE WHEEL RIM

Filed Dec. 21, 1927  5 Sheets-Sheet 1

Inventor
Elmer F. Brunner.

Attorney

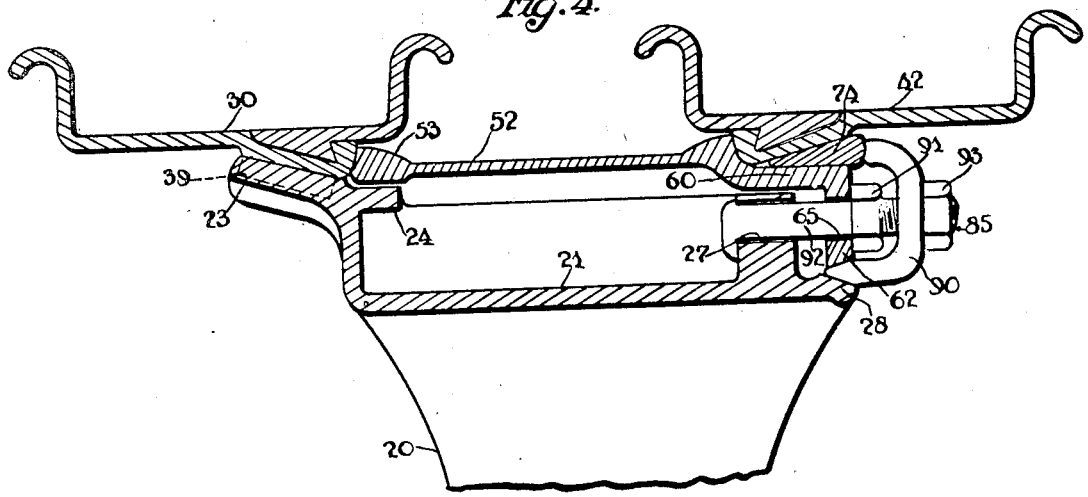
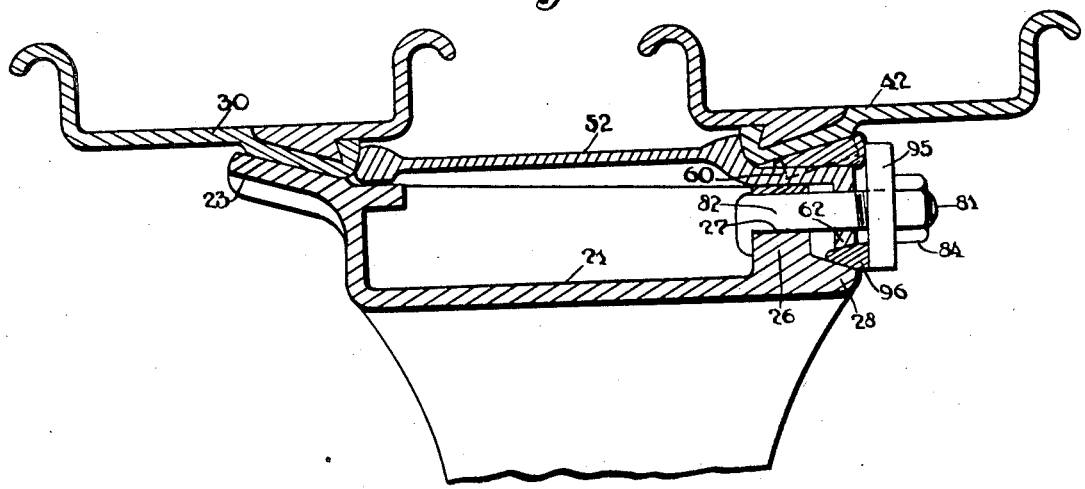
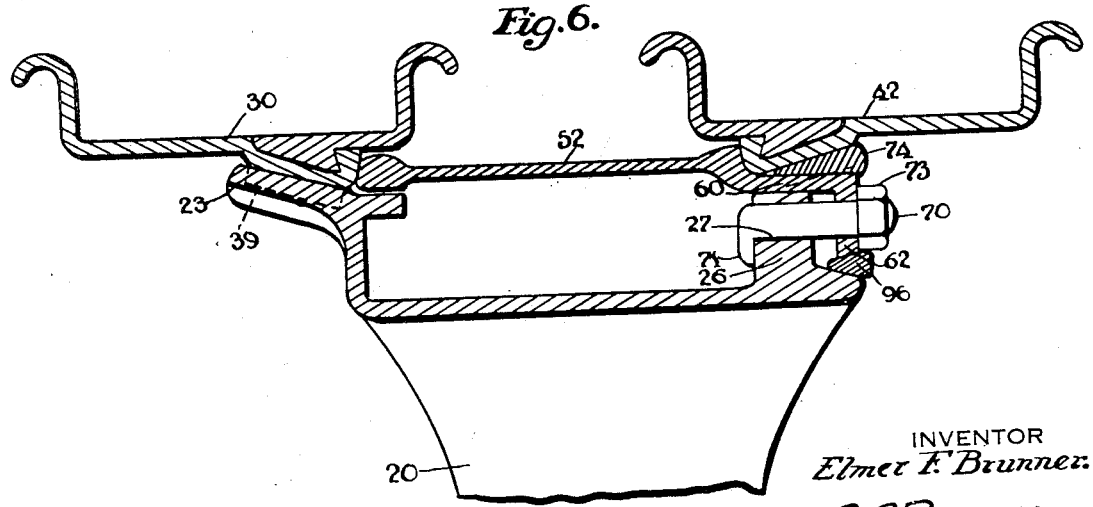

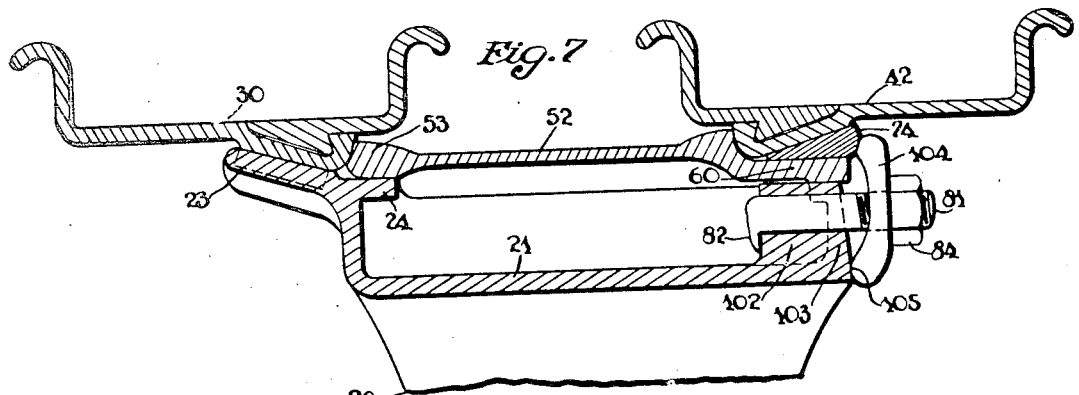
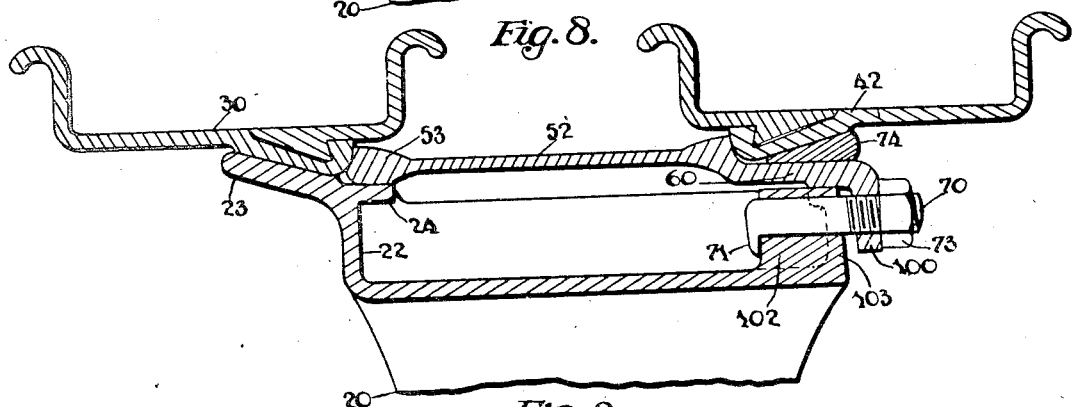
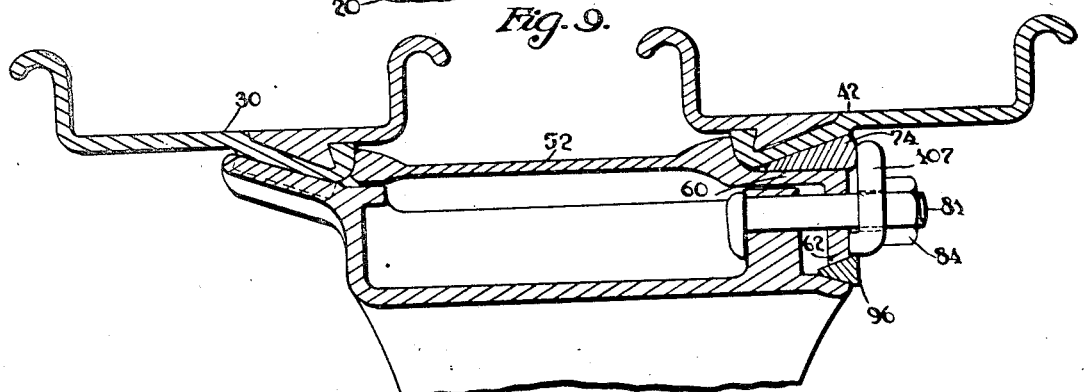
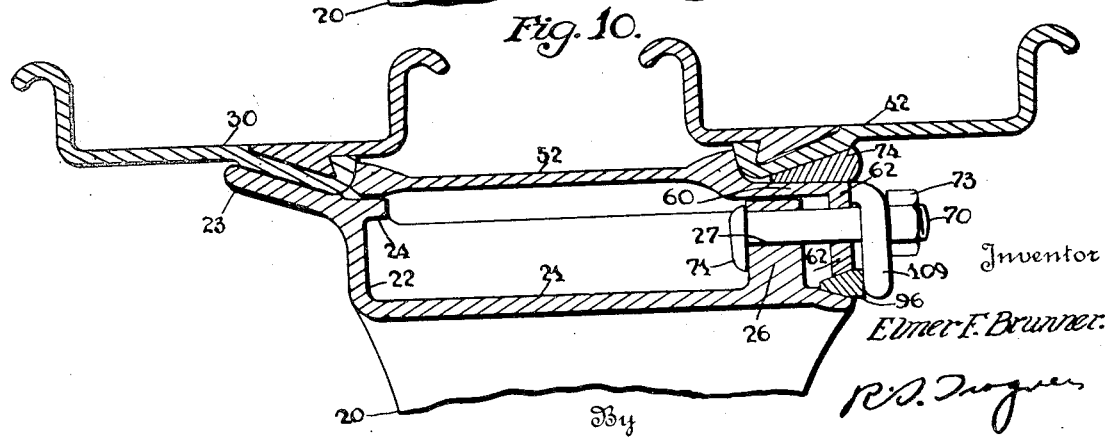

Dec. 22, 1931.   E. F. BRUNNER   1,838,050
VEHICLE WHEEL RIM
Filed Dec. 21, 1927    5 Sheets-Sheet 5

Inventor
Elmer F. Brunner.

By

Attorney

Patented Dec. 22, 1931

1,838,050

UNITED STATES PATENT OFFICE

ELMER F. BRUNNER, OF AKRON, OHIO, ASSIGNOR TO THE GOODYEAR TIRE & RUBBER COMPANY, OF AKRON, OHIO, A CORPORATION OF OHIO

VEHICLE WHEEL RIM

Application filed December 21, 1927. Serial No. 241,545.

My invention relates to rim mountings for vehicle wheels and it has particular relation to dual rim mountings for securing a plurality of resilient tires upon a common wheel.

One object of the invention is to provide an improved dual rim mounting in which the rims will be positively and evenly located and will operate in parallel relation.

Another object of the invention is to provide a dual rim mounting in which the outer rim is maintained parallel with the inner rim and is also removable from the wheel independently of the inner rim.

Another object of the invention is to provide a dual rim mounting in which the securing means for each rim is accessible from the outside of the wheel.

Heretofore in dual rim constructions employing a spacing band between the rims, a common means was employed including a spacing band, for securing both rims in position, the securing means being accessible from the outside of the wheel. By employing a common securing means one rim could not be removed without loosening the other. In another form of prior construction, the inner rim was secured independently of the outer rim but had its securing means located between the inner and outer rim supporting structures, and was therefore inaccessible from the outside of the wheel.

According to the present invention, a construction has been provided, employing a spacing band between the rims, and in which the rims are independently secured upon their supporting structures. In this construction, the securing means for both the inner and outer rims are accessible from the outside of the wheel.

For a better understanding of the invention, references may now be had to the accompanying drawings forming a part of this specification in which:

Fig. 4 is a cross-sectional view similar to Fig. 2, of another form of the invention in which common bolts are employed for securing the outer and inner rims;

Figs. 5 and 6 are cross-sectional views, similar to Figs. 2 and 3, of another form of the invention showing the outer-rim and inner-rim securing means, respectively;

Figs. 7 and 8 are cross-sectional views of still another form of the invention showing the outer- and inner-rim securing means, respectively;

Figs. 9 and 10 are cross-sectional views, of another form of the invention similar to that shown by Figs. 5 and 6, wherein clamp members are employed in both the inner- and outer-rim securing means;

Figure 11:
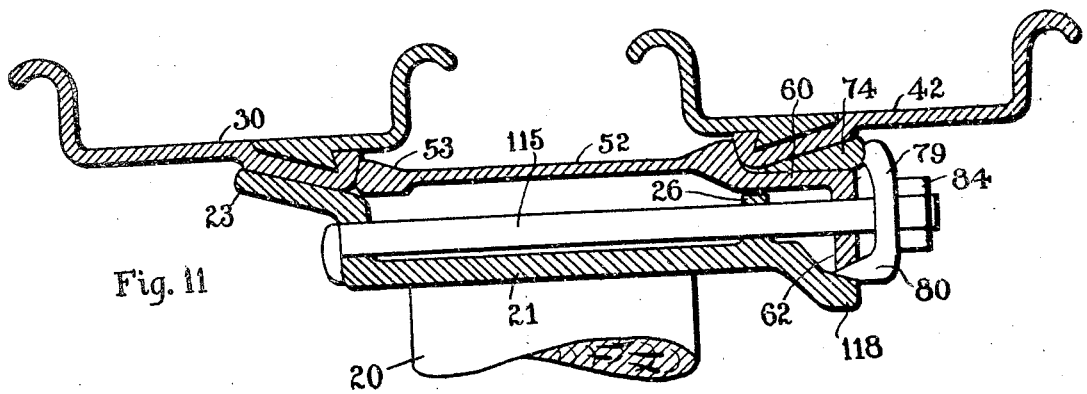
Figs. 11 and 12 are cross-sectional views of a form of the invention similar to that shown by Figs. 2 and 3, applied to an artillery type of wheel.
Figure 12:
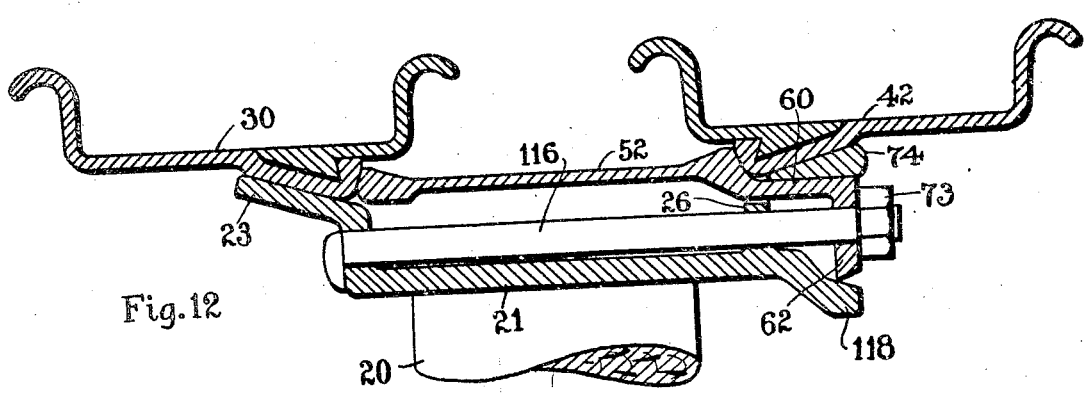
Figure 13:
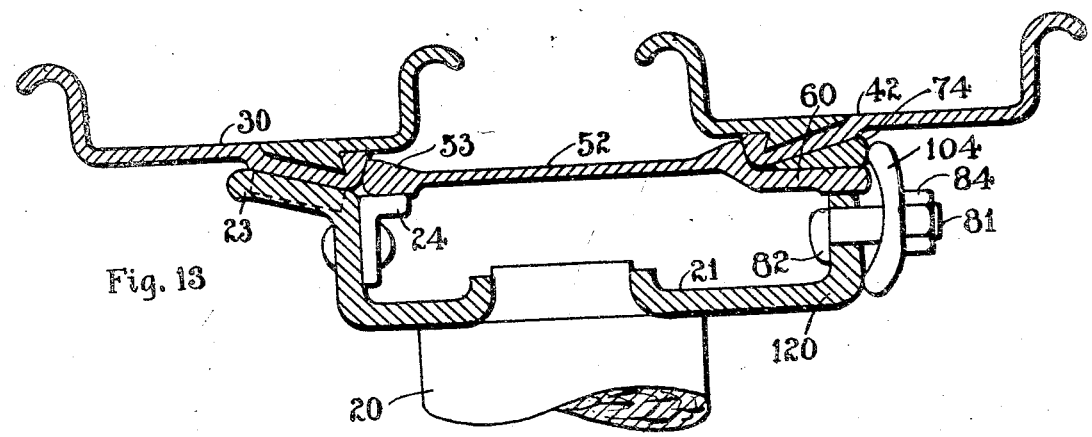
Figure 14:
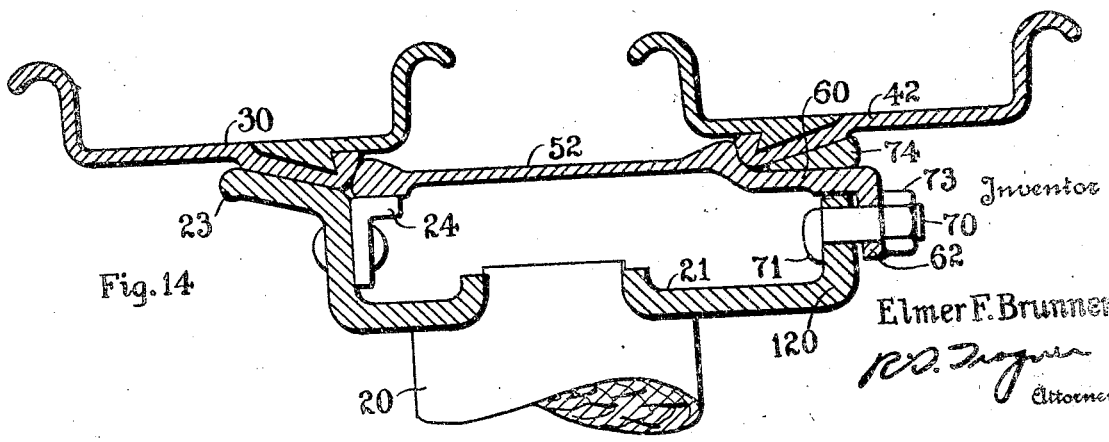
Figure 15:
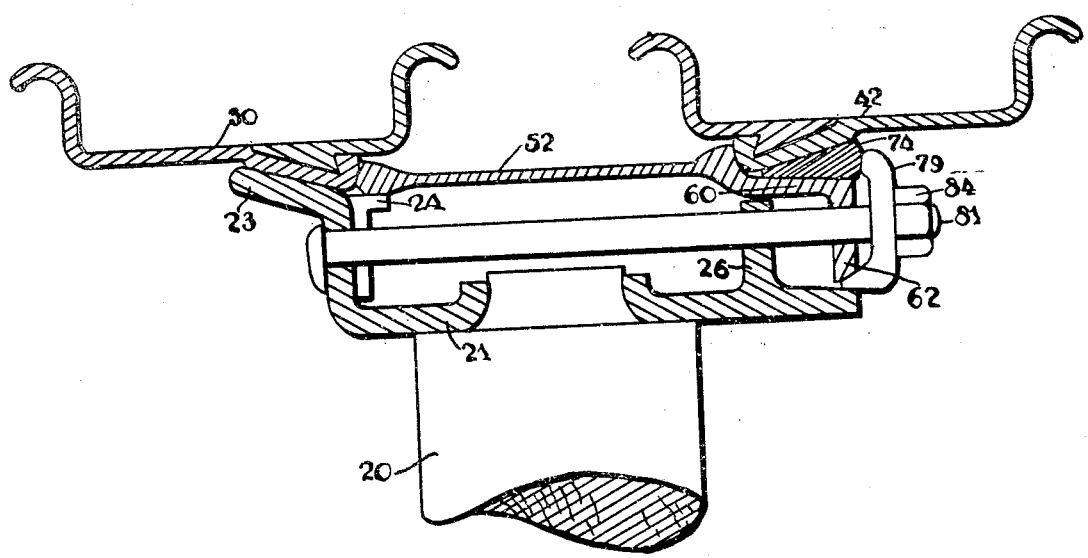
Figure 16:
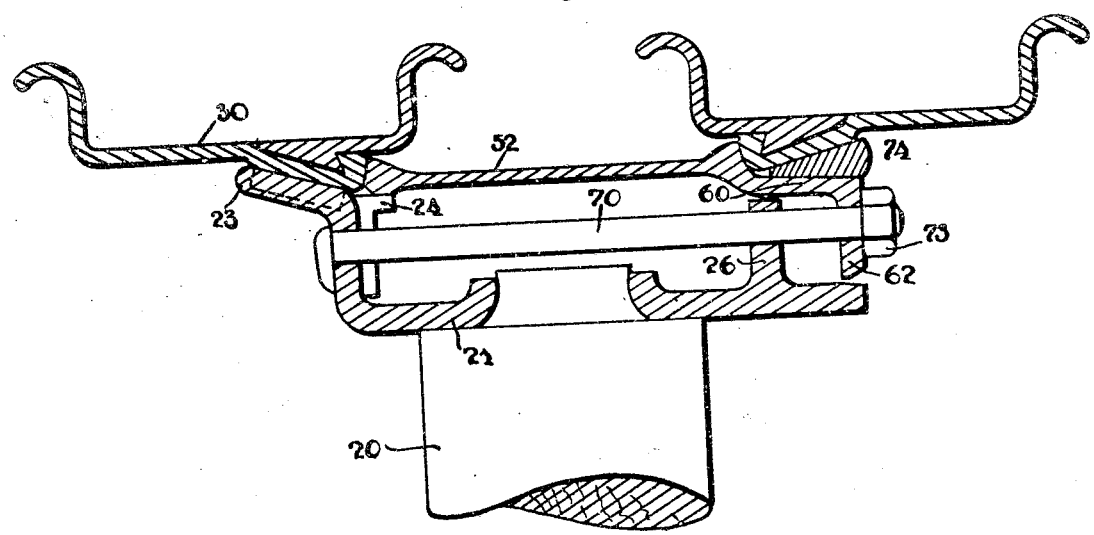

Figs. 13 and 14 are cross-sectional views of another form of the invention similar to that shown by Figs. 7 and 8, applied to an artillery type of wheel; and Figs. 15 and 16 are cross-sectional views of still another form of the invention similar to that shown by Figs. 11 and 12, but applied to a slightly different type of artillery wheel.

Figure 1:
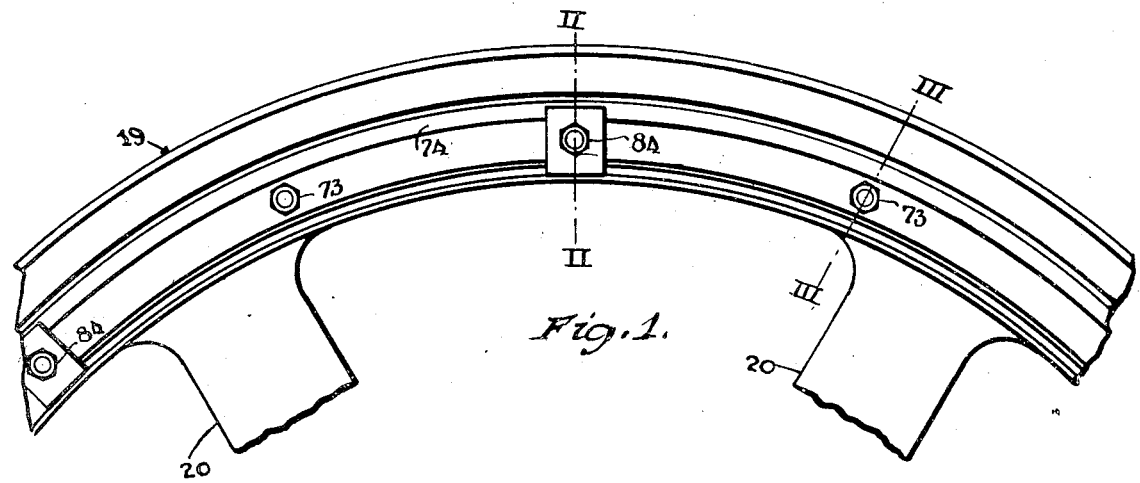
Fig. 1 is a fragmentary elevational view of a wheel, employing a dual rim assembly according to the invention.
Figure 2:
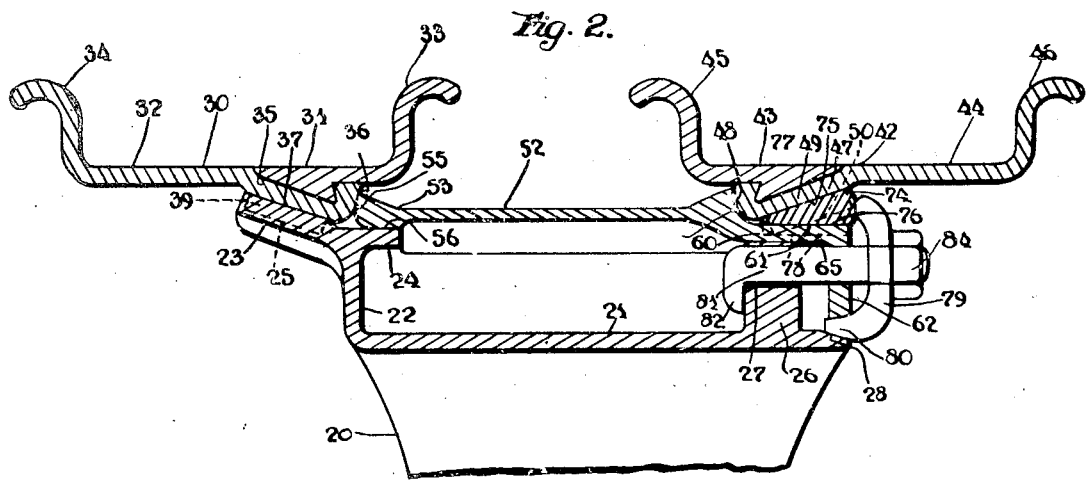
Fig. 2 is a cross-sectional view, on a larger scale, taken substantially along the line II—II of Fig. 1, showing the outer rim securing means in detail.
Figure 3:
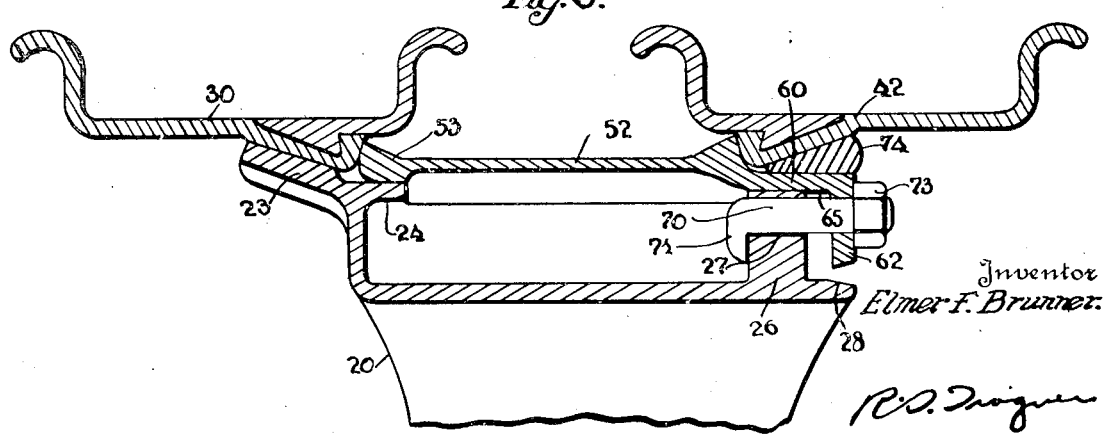
Fig. 3 is a cross-sectional view, on a larger scale, taken substantially along the line III—III of Fig. 1 and showing the inner-rim securing means in detail.

In a preferred form of the invention shown by Figs. 2 and 3, a wheel 19 is employed having spokes 20 and a felloe 21. On its inner side the felloe has a radial flange 22, which terminates in an outwardly inclined portion 23 and an oppositely extending lateral flange 24. At one point in its circumference the inclined portion 23 has an opening 25 formed therein, (shown by dotted lines). The felloe 21 adjacent its outer edge is provided with circumferentially spaced lugs 26, each of which has a bolt receiving opening 27 therein. The outer edge of the felloe 21 is laterally inclined, as indicated at 28, for a purpose hereinafter to be described.

An inner rim 30, i. e., the rim nearer the body of a vehicle, comprises an endless annular member 31 and a split ring or annular member 32, both of which are provided with tire engaging flanges 33 and 34, respectively. The rim has formed on its inner periphery a tapered portion 35 and a shoulder 36, the portion 35 having a tapered surface 37 adapted to rest upon the inclined portion 23 of the felloe. The portion 35 is also provided with a projection or driving lug 39 (shown in dotted lines) which coacts with the opening 25 in the inclined portion 23 of the felloe to form a driving connection between the rim and felloe.

The outer rim 42 is of the same type as the inner rim, having an endless member 43 and a split ring or annular member 44, which include tire-engaging flanges 45 and 46, respectively. The rim member 44 is provided with a tapered portion 47 and a shoulder 48; the portion 47 having a tapered rim seating surface 49 and a rim driving lug 50 (shown by dotted lines).

Between the rims 30 and 44 a spacing band 52 is located, having an enlarged inner edge portion 53. The enlargement 53 abuts the shoulder 36 of the inner rim at 55 and also has a surface 56 which rests upon the flange 24 of the felloe. Adjacent its outer edge the spacing band has a saddle surface 58 against which the shoulder 48 of the outer rim rests. The spacing band also extends horizontally beyond the saddle 58 as indicated at 60, to form a rim supporting surface 61 which is of a lesser diameter than the least diameter of the outer rim. The extension 60 is directed radially inwardly at its outer edge to form a flange 62 which terminates adjacent the inclined edge 28 of the felloe. The flange 62 is provided with spaced openings 65, which normally register with the openings 27 in the lugs 26.

The spacing bands 52 may be sectional, annular, or in the form of a split ring. The flange 62 is preferably annular but may be constructed in the form of a plurality of radially disposed spaced flanges, each having a bolt opening 65 therein.

In order to secure the inner rim in operative position, bolts 70 having heads 71 on their inner ends, extend through alternate projections 26 of the felloe, and also through alternate openings 65 in the spacing band. Nuts 73 threaded upon the end portions of the bolts are tightened to secure the spacing band and inner rim in their proper positions.

Between the inclined surface 49 of the outer rim, and the cylindrical surface 61 of the spacing band, a wedging member 74 is interposed, having surfaces 75 and 76 which contact with the rim surface 49, and the outer surface 61 of the spacing band, respectively. The member 74 may be a split ring, sectional, or annular member, but in either case, it has a driving slot 77 (shown by dotted lines), which receives the driving lug 50 of the outer rim. The rim is also connected in driving relation with the spacing band by the engagement of the lug 50 with a slot 78 in the extension 60 (shown by dotted lines), the slot being open at its outer end whereby the lug 50 may be moved laterally of the spacing band. If a sectional spacing band be employed, it is preferable that the lug 50 project between sections of the band.

A clamping lug 79 abuts at its upper end, the wedging member 74, and at its lower end it has an inwardly extending tapered projection 80. The projection 80 normally engages in wedging relation the radial inner edge of the flange 62, and the edge 28 of the felloe. Bolts 81 having heads 82 on their inner ends, project through the other alternate openings 27 in the projections 26, the other alternate openings 65 in the flange 62, and through the clamps 78. Nuts 84 threaded upon the outer ends of the bolts 81 are tightened against the lugs 79 to force the wedge 74 inwardly, and at the same time the projection 80 tends to force the flange 62 radially outwardly, whereby the outer rim is secured firmly in position.

According to the form of the invention as shown by Fig. 4, common securing means 85 are provided for both the inner and outer rims. This structure differs from that shown by Figs. 2 and 3, in that clamping lugs 90 are slightly larger than the clamping lugs 79 to provide a space between the clamps and the flange 62 of the spacing band for nuts 91. Bolts 92 are threaded throughout a substantial portion of their length to accommodate the nuts 91 inwardly of the clamp 90, and nuts 93 outwardly of the clamp. Movement of the nuts 91 inwardly upon the bolts 92, forces the spacing band inwardly, and secures the inner rim in position, while movement of the nuts 93 inwardly upon the bolts, secures the clamp 90, wedge 74, and outer rim in position. In this construction, although the means for securing the inner and outer rims in position employ common bolts, the outer rim may be removed independently of the inner rim.

In the construction shown by Figs. 5 and 6, the means for securing the outer rim in its position differs from the means shown by Fig. 2, in that a clamp member 95 and the wedging member 96 are separate instead of being integral as shown by the construction in Fig. 2. The wedging member 96 in this construction may be either sectional, annular, or in the form of a split ring.

In the construction shown by Figs. 7 and 8, the spacing band is provided with flange extensions 100, which correspond in number to the bolts 70. The felloe on its outer edge has a flange 103, and enlargements 102 which directly support the portion 60 of the spacing band. A clamp 104 in this construction has no wedging action at its lower end in conjunction with the felloe and spacing band, but instead, rests against the flange as indicated at 105. The manner of securing the rims in their operative positions is substantially the same as that described heretofore relative to Figs. 2 and 3.

In the construction shown by Figs. 9 and 10, clamping members 107 and 109 are employed in both the outer and inner rim securing means. The outer clamping members 107 provided on the bolts 81 abut at their outer ends against the wedge 74, and at their inner ends against the flange 62 of the spacing band. The means for securing the spacing band and the inner rim in proper position includes the clamps 109 on the bolts 70, the clamps abutting at their inner ends against the wedge 96, and at their outer ends the spacing flange 62. In this construction the inner rim securing means forces the wedge 96 inwardly, whereas in the construction shown by Figs. 5 and 6 the outer rim securing means forces the wedge 96 inwardly.

Figs. 11 and 12 show a form of the invention applied to an artillery type of wheel. In this construction, which is similar to that shown by Figs. 2 and 3, the securing bolts, indicated at 115 and 116, extend entirely laterally through the felloe. The felloe has its outer edge inclined as indicated at 118 to provide a bearing surface for the wedging member 80 on the clamp 79. The rims are secured in their operative position by tightening of the nuts 73 and 84 in the same manner employed in the construction shown by Figs. 2 and 3.

The construction shown by Figs. 13 and 14 is similar to that shown by Figs. 7 and 8, except that the invention is applied to an artillery type of wheel. No apertured lugs are employed in this construction as are provided at 102 in Figs. 7 and 8, the bolt heads 71 and 82 instead coact directly with an outer flange 120 of the felloe.

In Figs. 15 and 16 the form of invention is similar to that shown by Figs. 2 and 3, except that the felloe employed is particularly adapted for use on an artillery type of wheel.

While the foregoing description has contemplated the invention in several forms, it is apparent that a dual rim construction has been provided in which the advantages of a spacer band are retained, and additional advantages obtained of having the inner and outer rim securing means both accessible from the outside of the wheel. The construction affords a positive means for maintaining the rims in position whereby they will operate in relatively parallel relation. The construction also affords a means for releasing the outer rim from the supporting structure independently of the inner rim.

Although I have illustrated only the preferred forms which my invention may assume, and have described those forms in detail, it will be apparent to those skilled in the art that the invention is not so limited but that various modifications and changes may be made therein without departing from the spirit of the invention or from the scope of the appended claims.

What I claim is:

1. In a vehicle wheel, a rim supporting structure for dual rims, means for seating the inboard rim upon the supporting structure, a member for spacing the rims relatively, said spacing member extending laterally between the supporting structure and the outboard rim, an inclined seating face on the outboard rim, a wedging member between the seating face and the extended portion of the spacing member, a second wedging member between the extended portion of the spacing ring and the supporting structure, means for securing the spacing member in lateral position but permitting limited radial movement thereof, and means for securing both wedging members in place.

2. In a vehicle wheel, a rim supporting structure for dual rims, means for seating the inboard rim upon the supporting structure, a member for spacing the rims relatively, said spacing member extending laterally between the supporting structure and the outboard rim, an inclined seating face on the outboard rim, a wedging member between the seating face and the spacing member, means for securing the spacing member in operative position but permitting limited radial movement thereof, a second wedging member between the extended portion of the spacing member and the supporting structure, said second wedging member having an extended portion adapted to abut the first wedging member and means for securing the second wedging member in proper position.

3. In a vehicle wheel having laterally spaced rim-supporting portions for dual rims, a seat at the inboard portion for supporting the inboard rim, a spacing member slidably disposed on the rim supporting structures and extending over the outboard rim supporting portion, said spacing member having a flange projecting radially inwardly alongside the outboard rim supporting portion means for securing the flange to the outboard portion, and means for securing the outboard rim in its operative position on the spacing member which means serve to clamp against the radially inward end of the flange.

4. A vehicle wheel having a wheel-supporting structure for dual rims, a seat at the inboard side of the structure for supporting the inboard rim, a spacing member extending over the outboard side of the structure, said spacing member having a rib on its radially outer surface directed substantially radially, a radially directed flange projecting inwardly alongside the supporting structure, means for securing the flange to the structure, means for securing the outboard rim against the rib on the spacing member and for providing a wedging action between the structure and the radially inward edge of the flange, said rib positively preventing lateral movement toward the inboard edge of the spacing member.

5. A vehicle wheel comprising a supporting structure for dual rims, a spacing member between the rims, means for seating the inboard rim on the supporting structure, means including bolts for securing the spacing member in its operative position, and means mounted on said bolts for securing the outboard rim on the spacing member, said last mentioned means being removable from the bolts without disturbing the lateral position of the spacing member.

6. A vehicle wheel comprising a supporting structure for dual rims, a spacing member slidably mounted on the supporting structure, means for seating the outboard rim only on the spacing member, the spacing member including a radially inwardly directed flange disposed alongside the outboard side of the wheel, bolts projecting from the supporting structure through the flange, means on the bolts for securing the flange in its operative position, and clamping means on the outboard ends of the bolts for securing the outboard rim on the spacing member, said clamping means being removable without disturbing the lateral position of the spacing member.

In witness whereof, I have hereunto signed my name.

Signed at Akron, in the county of Summit, and State of Ohio, this 20th day of December, 1927.

ELMER F. BRUNNER.